United States Patent
Hannon et al.

(10) Patent No.: US 10,386,900 B2
(45) Date of Patent: Aug. 20, 2019

(54) THREAD AWARE POWER MANAGEMENT

(71) Applicant: Intel Corporation, Santa Clara, CA (US)

(72) Inventors: William R. Hannon, Hillsboro, OR (US); David P. Larsen, Hillsboro, OR (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1092 days.

(21) Appl. No.: 14/035,534

(22) Filed: Sep. 24, 2013

(65) Prior Publication Data

US 2015/0089249 A1    Mar. 26, 2015

(51) Int. Cl.
| | | |
|---|---|---|
| *G06F 1/32* | (2019.01) | |
| *G06F 1/26* | (2006.01) | |
| *G06F 1/3206* | (2019.01) | |
| *G06F 1/3287* | (2019.01) | |
| *G06F 1/329* | (2019.01) | |
| *G06F 9/48* | (2006.01) | |
| *G06F 9/50* | (2006.01) | |

(52) U.S. Cl.
CPC ............. *G06F 1/26* (2013.01); *G06F 1/3206* (2013.01); *G06F 1/329* (2013.01); *G06F 1/3287* (2013.01); *G06F 9/4893* (2013.01); *G06F 9/5094* (2013.01); *Y02D 10/171* (2018.01); *Y02D 10/22* (2018.01); *Y02D 10/24* (2018.01)

(58) Field of Classification Search
CPC ........................................................ G06F 1/32
USPC ....... 713/300, 310, 320, 321, 322, 323, 324, 713/340, 375
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |

(Continued)

FOREIGN PATENT DOCUMENTS

EP        1 282 030 A1    5/2003

OTHER PUBLICATIONS

European Patent Office, European Search Report dated Jan. 27, 2015, In Europe Patent Application No. 14184354.0.

(Continued)

*Primary Examiner* — Jaweed A Abbaszadeh
*Assistant Examiner* — Keshab R Pandey
(74) *Attorney, Agent, or Firm* — Trop, Pruner & Hu, P.C.

(57) ABSTRACT

In an embodiment, a power management controller is to receive thread information from a scheduler, where the thread information includes thread priority information for a thread scheduled to a core of a multicore processor. The power management controller is further to receive power consumption information from a power controller and to determine a power management action to be taken by the power controller on at least one core based at least in part on the thread priority information. Other embodiments are described and claimed.

22 Claims, 9 Drawing Sheets

(56) References Cited

U.S. PATENT DOCUMENTS

| | | |
|---|---|---|
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 8,990,591 B2* | 3/2015 | Zou .................. G06F 1/3203 713/300 |
| 2001/0044909 A1 | 11/2001 | Oh et al. |
| 2002/0194509 A1 | 12/2002 | Plante et al. |
| 2003/0028816 A1 | 2/2003 | Bacon |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0128100 A1* | 7/2004 | Rotem .................. G01K 7/42 702/136 |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0107262 A1* | 5/2006 | Bodas .................. G06F 9/5027 718/100 |
| 2006/0117202 A1 | 6/2006 | Magklis et al. |
| 2006/0123251 A1 | 6/2006 | Nakajima et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0143640 A1* | 6/2007 | Simeral .................. G06F 1/28 713/320 |
| 2007/0156992 A1 | 7/2007 | Jahagirdar |
| 2007/0180280 A1* | 8/2007 | Bolan .................. G06F 1/3203 713/300 |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2008/0250415 A1* | 10/2008 | Illikkal .................. G06F 9/5077 718/103 |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0150893 A1* | 6/2009 | Johnson .................. G06F 9/5088 718/104 |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0217277 A1* | 8/2009 | Johnson .................. G06F 1/3203 718/102 |
| 2009/0235105 A1 | 9/2009 | Branover et al. |
| 2009/0328055 A1* | 12/2009 | Bose .................. G06F 1/3203 718/105 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0159198 A1* | 6/2012 | Naffziger .................. G06F 1/324 713/300 |
| 2012/0246506 A1 | 9/2012 | Knight |
| 2012/0284729 A1* | 11/2012 | Sharda .................. G06F 9/5094 718/104 |
| 2013/0061064 A1 | 3/2013 | Ananthakrishnan et al. |
| 2013/0067132 A1* | 3/2013 | Guddeti .................. G06F 13/24 710/260 |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of A Processor," by Intel Corporation.

International Application No. PCT/US2012/028902, filed Mar. 13, 2012, entitled "Dynamically Controlling Interconnect Frequency In A Processor," by Intel Corporation.

International Application No. PCT/US2012/028876, filed Mar. 13, 2012, entitled "Dynamically Computing An Electrical Design Point (EDP) for A Multicore Processor," by Intel Corporation.

U.S. Appl. No. 13/600,568, filed Aug. 31, 2012, entitled, "Configuring Power Management Functionality In A Processor," by Malini K. Bhandaru, et al.

European Patent Office, Office Action dated Feb. 20, 2017, in European Patent Application 14184354.0.

\* cited by examiner

THREAD AWARE POWER MANAGEMENT

TECHNICAL FIELD

Embodiments relate to power management of a system, and more particularly to power management using thread information.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Embodiments may be used to perform system level power management including throttling of one or more cores of a multicore processor in a manner that is aware of individual software threads. By extending power management to include a view of thread execution and priority, decisions may be based on more than simply a hardware view. Certain embodiments may be particularly applicable to power management of a system executing virtualized workloads. Although the scope of the present invention is not limited in this regard, a system power management solution may be implemented within a power management controller that executes outside of a processor.

Using an embodiment, power management techniques may prioritize power management actions to target lower priority threads (such as throttling of cores running such lower priority threads) while maintaining higher priority threads such as mission critical threads at maximum performance levels, e.g., by not throttling cores running these threads (and even potentially allowing these cores to operate at higher than a guaranteed operating frequency). Embodiments may also allow for throttling to be aware of a virtualized environment, leading to better quality of service (QoS) for systems with multiple virtual machines (VMs) running at a given time.

Figure 1:
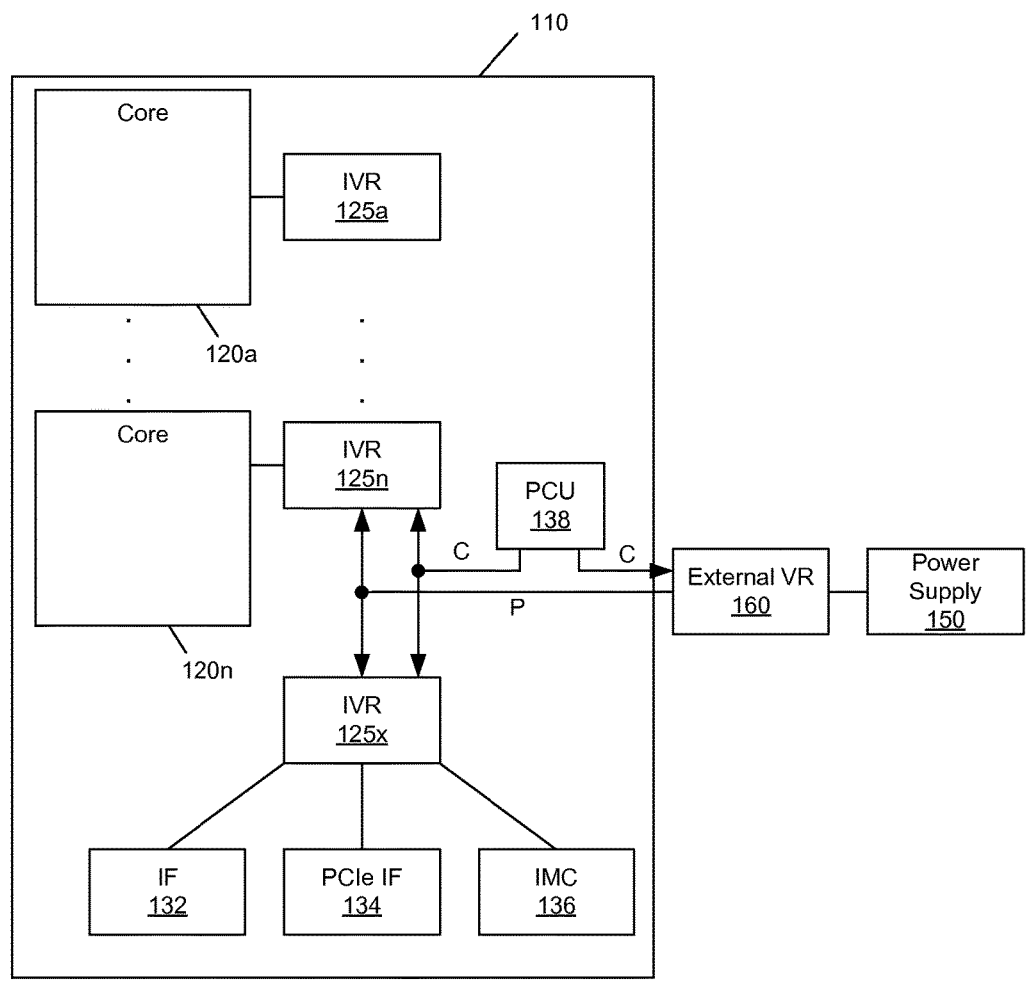
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to communicate with an external power management system such as a power management controller of a chipset or other system component that handles wider system-related power management.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the thread aware power management described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
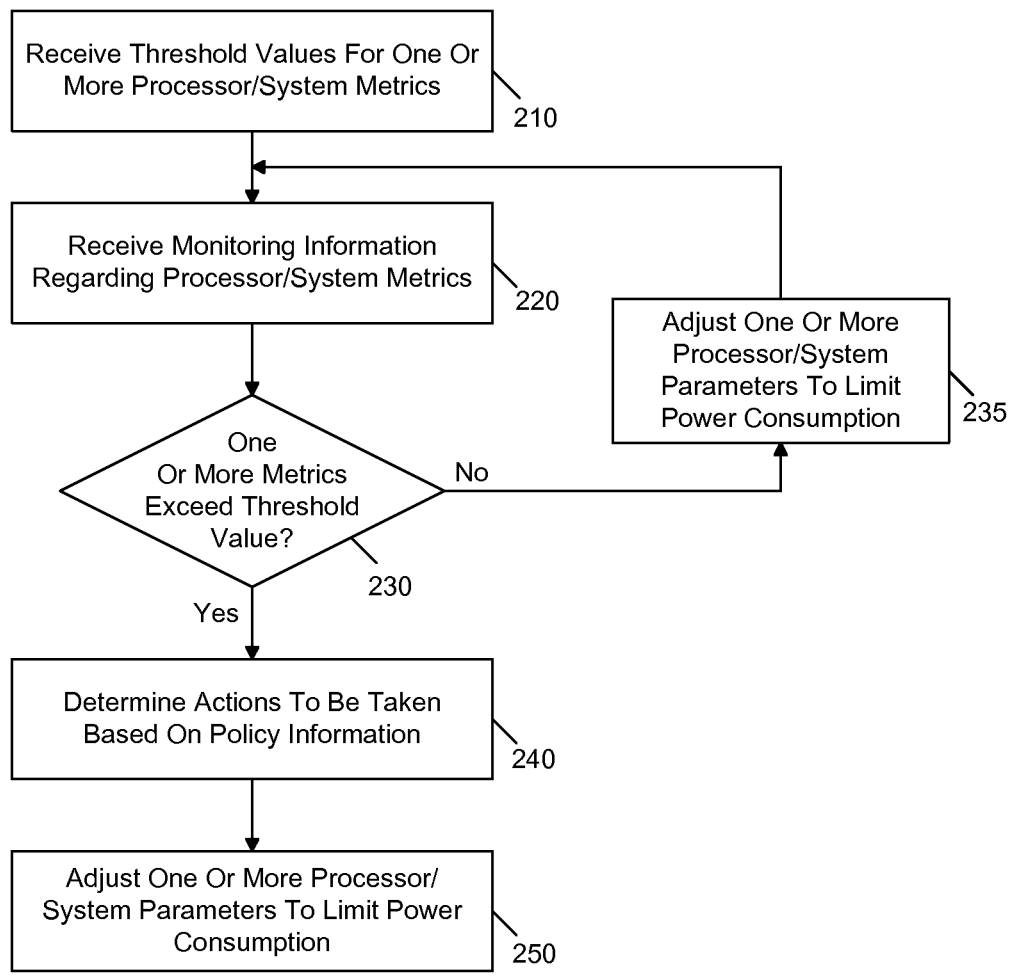
FIG. 2 is a flow diagram of a high level method for performing power management operations in accordance with an embodiment of the present invention.

Referring now to FIG. 2, shown is a flow diagram of a high level method for performing power management operations in accordance with an embodiment of the present invention. As shown in FIG. 2, method 200 may be performed by a power management controller, which can be implemented in a variety of different manners. In a particular embodiment, the power management controller may be implemented within a peripheral controller of a system, and more particularly may be realized by execution of power management firmware on a microcontroller of the peripheral controller. Of course understand that in other implementations, method 200 may be performed by other combinations of hardware, software and/or firmware in various locations, e.g., in a peripheral controller, processor or other circuitry of a system. Note in any event this power management controller is independent from the OS/cores and does not execute in host memory.

Note that this power management controller may be configured to enforce power management policies on a system wide basis. To this end, the power management controller interacts with an OS power management system (such as ACPI discussed above), processor-based hardware power control (such as a PCU as discussed above), and system-wide power management components. The system-wide power management controller may take different forms depending upon a system form factor. For example, in a mobile computing device or another type of portable battery-powered device, the system-wide power controller may be a separate power management integrated circuit (PMIC). In larger systems such as a server system where the server may be one of a plurality of server blades or individual servers in a data center environment, the system-wide power management controller may be implemented via a baseboard management controller or other network-wide manager which may communicate with the power management controller here via an out-of-band mechanism such as via an intelligent platform management interface (IPMI) mechanism. In yet further embodiments, the power management controller may be implemented in system locations other than a peripheral controller. For example, the power management controller can be implemented at least in part within a baseboard management controller.

As seen, method 200 begins by receiving threshold values for one or more processor/system metrics (block 210). In an example embodiment, these metrics may correspond to power consumption levels, either for one or more processors of the system, or an overall system power consumption level, among other variations. Understand that the power consumption levels may be derived from different information such as a thermal design point (TDP), an electrical design point (EDP), or other metric. And in some embodiments, a composite metric may be devised of multiple independent metrics. For example, thresholds may be provided for a total system power consumption level (e.g., 200 watts), a processor power consumption level (e.g., 100 watts), a memory power consumption level (e.g., 50 watts), or other individual or composite power consumption thresholds. These threshold values may be provided to the power management controller for storage in an appropriate configuration storage and may be provided e.g., on power up of a system. Understand that these threshold values may be configured during system manufacture, e.g., by an original equipment manufacturer (OEM), or may be dynamically entered and/or updated, e.g., by a user.

After such configuration and storage of these threshold values, normal operation of the system may occur. During such operation, monitoring information may be received regarding these metrics (block 220). For example, a power controller of the one or more processors such as a power control unit (PCU) may be configured to periodically provide such monitoring information to the power management controller. As an example, a total power consumption level of each of one or more processors can be provided on a regular basis. Control next passes to diamond 230 to determine whether one or more of these metrics exceeds a corresponding threshold value. Thus the received values may be compared against corresponding threshold values to determine whether a given threshold value has been or is about to be exceeded. If not, further monitoring can be performed. Also note that control may pass through block 235 where one or more processor/system parameters may be adjusted to increase power consumption if previously a limit was placed on the power consumption due to a previous exceeding of the threshold, details of which are discussed further below.

Still referring to FIG. 2, if instead it is determined that a given metric has exceeded its threshold value, control passes to block 240 where an action to be taken may be determined. More specifically, this power management action may be determined based on policy information. Such policy information may be set forth in implementation of an algorithm to perform power management using the power management controller and can take many different forms in different embodiments. In general, this policy information may help determine an appropriate action to relieve a power or other constraint on a processor/system.

Next control passes to block 250 where based on the actions taken, one or more processor/system parameters may be adjusted to limit power consumption. For example, one or more cores may be placed into a low power or powered off state, an operating voltage and/or frequency may be reduced, one or more peripheral devices may be placed in a low performance state or a low power/powered off state or so forth. Understand that while shown at this high level in the embodiment of FIG. 2, the scope of the present invention is not limited in this regard.

Figure 3:
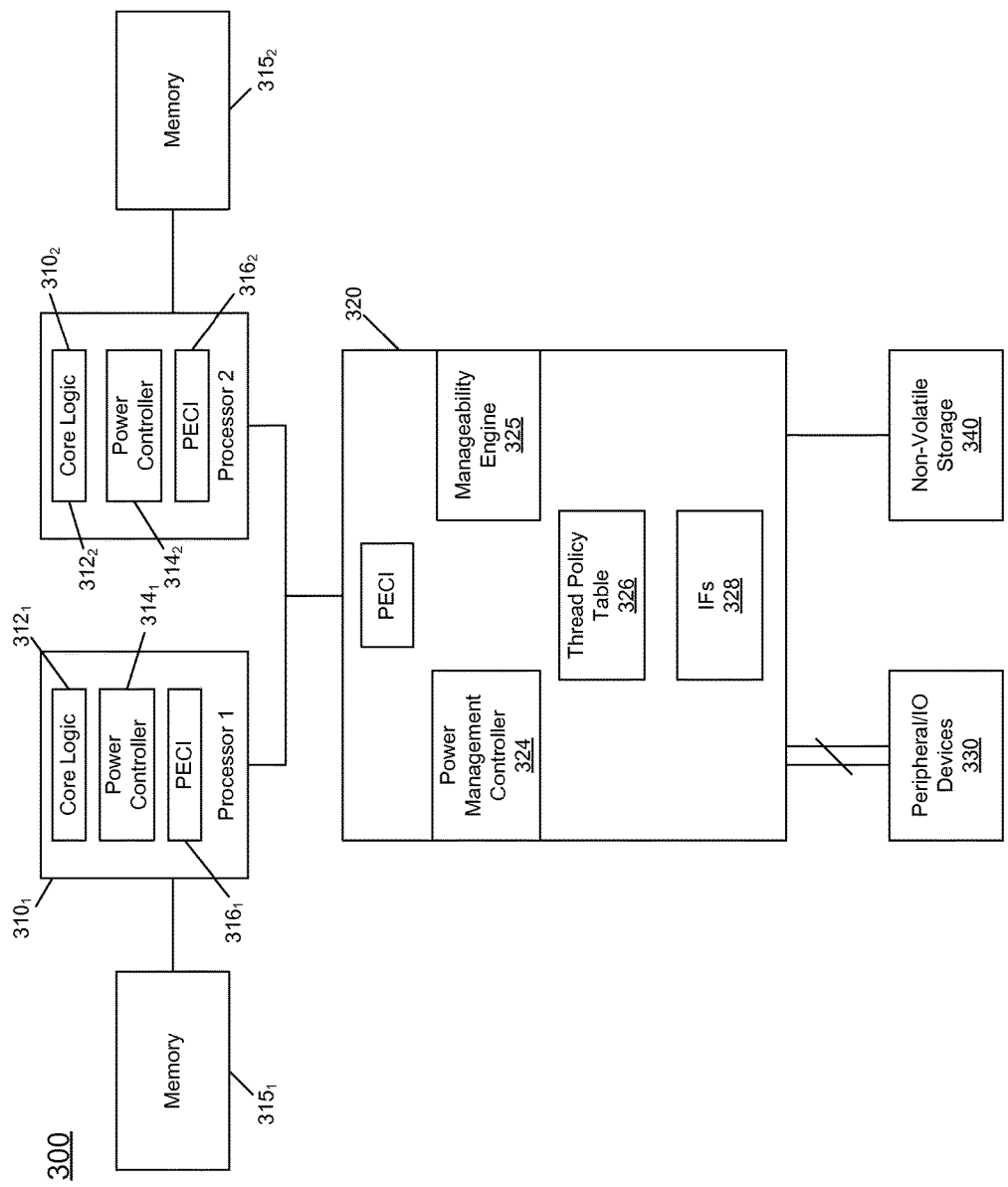
FIG. 3 is a block diagram of an example multiprocessor system in accordance with an embodiment of the present invention.

Referring now to FIG. 3, shown is a block diagram of an example multiprocessor system in accordance with an embodiment of the present invention. As shown in FIG. 3, system 300 includes a plurality of processors $310_1$-$310_2$. Understand that while shown with only two such processors for ease of illustration a multiprocessor system may include more and potentially many more than two processors. In the example shown, each of the processors 310 is a multicore processor including a plurality of cores within a core logic portion $312_1$-$312_2$. Each of these cores may be associated with other processor circuitry such as an independent voltage regulator, a cache memory portion among other components. In an example, the multicore processor may be implemented as a multi-tile processor, where each tile includes one or more cores, one or more cache memories, and one or more voltage regulator circuits among other logic and interface circuitry.

As further seen in FIG. 3, each processor 310 also includes a power controller $314_1$-$314_2$. As an example, these power controllers each may be implemented as a PCU that executes power management code to take actions with regard to the power states of the various circuitry of the processor, e.g., based on operating conditions, configuration information and so forth. Each processor 310 further includes an interface $316_1$-$316_2$. In the embodiment shown interface 316 is a platform environmental control interface (PECI) interface that acts as a sideband channel between processor 310 and a peripheral controller 320 to enable sideband communication of various environmental and other information without affecting a primary communication path used by application/OS communications. And, via this sideband or out of band path, a guaranteed response time can be realized as OS operation does not impact the power communications here.

As further shown in FIG. 3, each processor 310 may be coupled to a portion of a distributed memory, namely memory portions $315_1$-$315_2$. In an embodiment, the memory may be implemented as dynamic random access memory (DRAM), and may be arranged as a uniform memory architecture (UMA) or a non-uniform memory architecture (NUMA) in different examples.

Referring now to peripheral controller 320, understand that while shown as a separate component e.g., a separate integrated circuit in the example of FIG. 3, in other implementations a peripheral controller may be implemented within the same package as one or more of the processors e.g., as a single die or multichip module. In general, peripheral controller 320 is configured to interface with various peripheral devices of a system such as various peripheral/IO devices 330 and a non-volatile storage 340, such as a flash storage or other mass storage device.

For purposes of discussion here, peripheral controller 320 includes a PECI interface 322 to enable a sideband communication path with the processors. In addition, a management engine 325 is present. In general, management engine 325 may be a microcontroller or programmable logic configured to execute various firmware and other instructions. In addition, peripheral controller 320 includes a power management controller 324 which may in some embodiments be a different microcontroller configured to execute power management firmware of the peripheral controller. In general, this power management firmware may be configured to control higher level power management operations than the PCUs of the processors, as the power management controller has a greater view of the system and its operation and further can perform power management operations for components outside of the processor. In addition, as discussed herein, power management controller 324 may be configured to provide control information in an upstream direction to the processor to enable the PCU to perform certain power management control operations under control of this power management controller. Although shown as separate components, understand that in another embodiment the functionality of power management controller 324 may be instead incorporated within management engine 325, which may include firmware to execute the power management controller functions.

As will be described herein to enable fine-grained power management control that takes into account not only hardware factors, but also software factors including thread information such as thread priority for various threads executing on the different cores, a thread policy table 326 is present within the peripheral controller. Peripheral controller 320 further includes a set of interfaces 328 to enable communication with various other devices of the system. Understand that while shown at this high level in the embodiment of FIG. 3, the scope of the present invention is not limited in this regard.

As described above, an internal processor power management controller (such as a PCU) may enable control of power management at core and thread level granularity. Such control may be realized in part using an IVR and per core P-states as discussed above. When combined with an OS virtual machine monitor (VMM) creating VMs out of a pool of available advanced programmable interrupt controller (APIC) IDs, tight loop controlled VM aware power management may be realized. Without loss of generality, this feature may be expanded by task instead of VM.

In an embodiment, the thread information may include a unique thread ID, unique application ID, APIC ID of the thread, and a thread priority as assigned by the operating system. In an embodiment, the thread ID is generated by the OS on thread creation and may correspond to an OS process ID (PID). In turn, each application (or VMM) may have a unique application ID. The APIC ID is an internal hardware ID that allows the power management controller to directly monitor a thread and determine on which core the thread is running. APIC IDs may be associated with a core on which the thread is currently executed (and which may be dynamically changed). The thread priority may be an indicator to identify a relative priority of a given thread, and which may be generated by the OS. Additional information such as a workload type may also be included in the thread information. Note that in some embodiments, a thread tree (which is a primary application thread that launches worker threads) may pass its thread priority association to these threads. In some embodiments, a management agent may refine or modify these assumptions.

In the case of a VMM, when a new VM is created, the VMM generates a VM-ID. This VM-ID may be used to correspond to the thread ID of the message, and the application ID may be unique to the VMM. These values along with the associated APIC IDs may be communicated to the power management controller, e.g., via a sideband interface. In turn the power management controller may utilize the VM-ID and the APIC ID to control power for each pool of resources. Of course in other embodiments, alternate communication paths may be used to send the thread information messages to an internal manageability engine in the chipset.

The power management controller may utilize this thread information obtained from the operating system along with additional information, e.g., as received from the PCU, to maintain a table of active threads, also referred to herein as a thread policy table. In such embodiment, the thread ID is used to track individual threads and the application ID allows monitoring of multiple threads that may be associated with a particular software application that uses multiple threads, such as multiple VM's hosted by a VMM. Using a single application ID for multiple threads enables global power management control for threads, and also enables collection of statistics regarding application performance (and power consumption) which may enable predictions to be made and used by the OS in scheduling decisions (e.g., as to thread scheduling on a given core).

As described above, the thread priority indicator identifies a relative priority of a given thread. For example, an N bit indicator may be used to identify priority such that each thread may have a unique thread priority. Of course, it is also possible to groups threads within a given thread priority level. Then as described herein, it is possible to perform power management actions equally on all threads of a given pool of threads having the same priority level.

Using this thread priority information, a power management controller may determine whether to throttle a core or take another power management action based on whether a low priority or high priority thread is running on the core. When combined with QoS metrics, the power management controller can elevate groups of threads based upon an allocation pool or conversely power manage the pool.

Embodiments may be configured to provide additional power management capabilities when crisis power management is desired. For example, when a power supply indicates the system is reaching an associated power cap, one or more groups of critical threads (VMs) can be left unaffected, and only lower priority VM's (pools of threads) which may be consuming power are power controlled.

In an embodiment, the PCU may monitor and provide per core power consumption information, e.g., using per core energy counters, and communicate this information to the power management controller, which in turn can calculate the power consumption of each thread assuming that core utilization per APIC ID is available. In an embodiment, the utilization of a core attributable to each APIC ID may be known to the power management controller. Additionally the per core energy consumption is known. Thus if a core is consuming 10 watts for a specific time window (for example), and during that time 70% of the utilization was attributable to APIC ID 1 and 30% of the utilization was attributable to APIC ID 2, then the power management controller would report that APIC ID 1 used 7 watts and APIC ID 2 used 3 watts.

In an embodiment, a method for performing power management may be as follows. When a new thread starts, the OS passes the thread information to the power management controller via, e.g., via a configuration and status register (CSR) (e.g., via a PCIe™ configuration space). The processor power management subsystem sends an alert to the management engine running a system power management algorithm, which creates a table entry for this thread, and checks to see whether this thread is associated with an existing known application based on application ID, and sends a request to the processor (e.g., PCU) to determine on which core that thread is running, which may be stored as a core identifier in the thread policy table with the entry for the thread. The power management controller may then calculate throttling weighting based on all this information to throttle cores that are running lower priority threads, and/or avoid cores that have high priority threads, or both. Such operation continues until the OS signals that a thread is being terminated, which is communicated to the power management controller (e.g., via CSR/MSR write). As such, the power management controller detects that this thread has ended.

In an embodiment, thread priority and QoS metrics may be set via a network since the system management power controller is network facing and can be controlled by a higher level software entity such as a data center manager, without loss of generality.

By factoring thread information and priority into power management control, power management systems can intelligently throttle the systems to maintain power envelopes, while having lower potential impact to end user applications.

Embodiments thus enable power management while minimizing performance impact to end user critical applications. Additionally, thread power consumption monitoring allows an end user to better predict real power usage of applications, and/or to provide a better granularity service mode for billing end users for actual power consumption of individual applications. Embodiments of the power management techniques described herein may be aware of and can support a virtualized environment and provide a high QoS, while still providing an intelligent power management solution.

Figure 4:
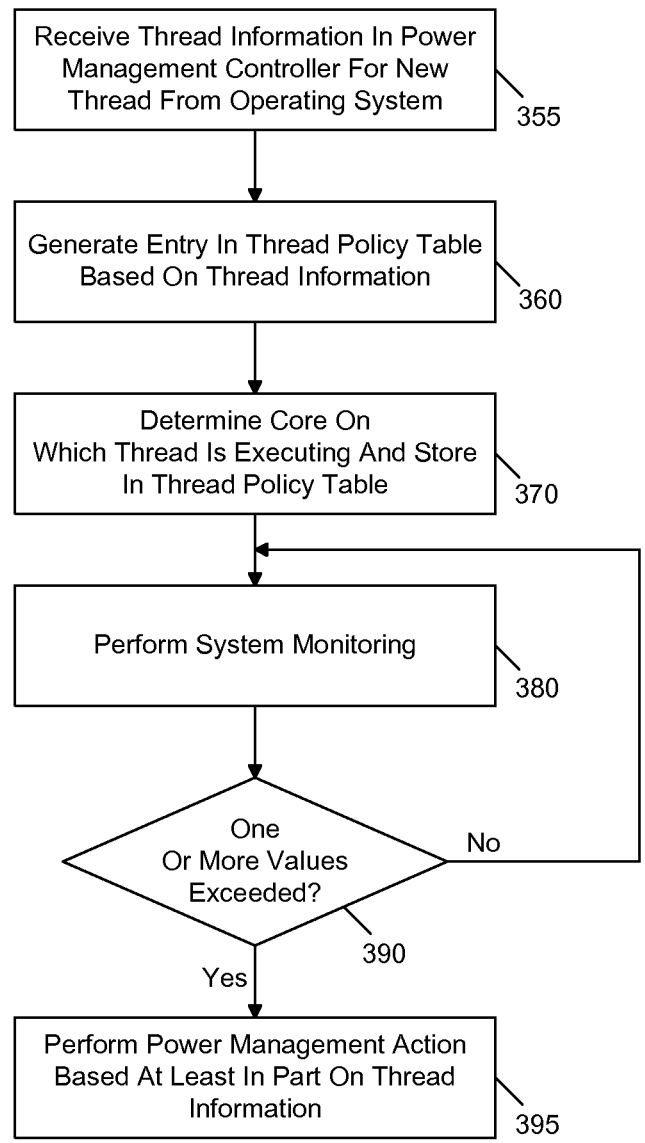
FIG. 4 is a flow diagram of a method for using thread information in directing power management operations for a system in accordance with an embodiment of the present invention.

Referring now to FIG. 4, shown is a flow diagram of a method for using thread information in directing power management operations for a system in accordance with an embodiment of the present invention. In general, method 350 of FIG. 4 may be performed in a power controller or other programmable logic as described above with FIG. 2. Method 350 begins by receiving thread information in the power management controller from an OS. More specifically at block 355 when a new thread is created by the OS, the OS may communicate certain thread information to the power management controller. Although the scope of the present invention is not limited in this regard, in an embodiment this thread information includes the above-described thread ID, application ID, APIC ID, and thread priority. From this thread information, an entry is generated in a policy table (block 360). More specifically, this entry may be generated by a manageability engine, which receives the thread information from the power management controller. Each active thread may include an entry in this table. Entries each may include a plurality of fields including fields for the above information, among additional information.

Still referring to FIG. 4, next it may be determined the core on which this thread is executing (block 370). In an embodiment, this determination may be based on communication with the processor and more specifically a communication with an APIC controller that maintains an association of APIC identifiers and corresponding cores. Note that such associations may dynamically change during execution of a thread. This information, which may be in the form of a core ID, also may be stored in the entry of the thread policy table such that the APIC ID maps to the core ID for the current core on which the thread is executing. At this point information regarding the thread is present in the appropriate storage within the peripheral controller and normal execution of the thread may begin on an indicated core.

At block 380 system monitoring may be performed. As generally described above, the power management controller may receive information from a variety of sources including various platform components as well as from one or more processors. More specifically, power consumption information may be received from the processors, e.g., directly from a corresponding PCU via a sideband (e.g., PECI) interface. Next it may be determined whether one or more threshold values are exceeded (diamond 390). As described above, a variety of different thresholds may be present and can be used in comparison to the received metric power consumption information to determine whether a threshold value is about to be exceeded.

If a threshold has been met or exceeded, control passes to block 395, where power management actions may be performed. More specifically, based at least in part on the thread information a selected power management action may be taken. For example, one or more cores may be throttled. More specifically, the selected core may be determined based at least in part on the thread that is executing on the core such that thread priority is considered in the power management decision. Stated another way, when there are multiple threads being executed, a core that is executing a lower priority thread is selected for throttling, rather than a core executing a higher priority thread.

This may be the case even when the core that is executing the higher priority thread is consuming greater power. Thus in contrast to conventional power management operation, it is not the highest power consuming core that is necessarily selected for throttling; instead thread information among possibly other performance information such as core efficiency is considered in making a determination of an appropriate core for throttling or placing into a given low power state. Of course, a variety of different power management actions may be performed both with regard to the system's processors as well as other components of the system. In any event, the thread information obtained from the OS (or obtained using that information) and stored within the thread policy table is used in making a determination of the appropriate power management action to take.

Note that the loop between blocks 380, 390 and 395 may continually be performed in normal system operation during execution of threads. Also during such operation the power management controller and/or the manageability engine may maintain statistics, e.g., within the thread policy table or another location, regarding thread execution. More particularly in some embodiments, statistics may be maintained on a per application basis such that for each application ID, runtime statistics regarding performance, power consumption and other information may be maintained. In one example, performance is a reflection of how much time a specific application has had its threads operating in a throttled condition (as a form of performance counter to indicate that it is not operating at peak efficiency). Power consumption may reflect the amount of processor power consumed by the specific application.

This information may regularly be communicated to the OS for use by the scheduler in making scheduling decisions as to particular cores on which to schedule threads. Further in this regard, the entire thread policy table may be communicated to the OS on a regular basis such that the OS may also use this information in scheduling workloads. In this way, a new thread may be scheduled to an appropriate core. Also understand that in addition to sending pure statistical information, feedback information also may be sent to the OS. This feedback information may take different forms. For example, the feedback information may provide an indication such as a hint of an appropriate core for scheduling threads based on power consumption. For example, by providing a hint to schedule a newly created thread on a first core, lower power consumption may be achieved than scheduling the thread to a different core. Furthermore, in some implementations this feedback information may be provided responsive to a request from the OS to obtain guidance as to a most appropriate core for scheduling a newly created thread.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Figure 5:
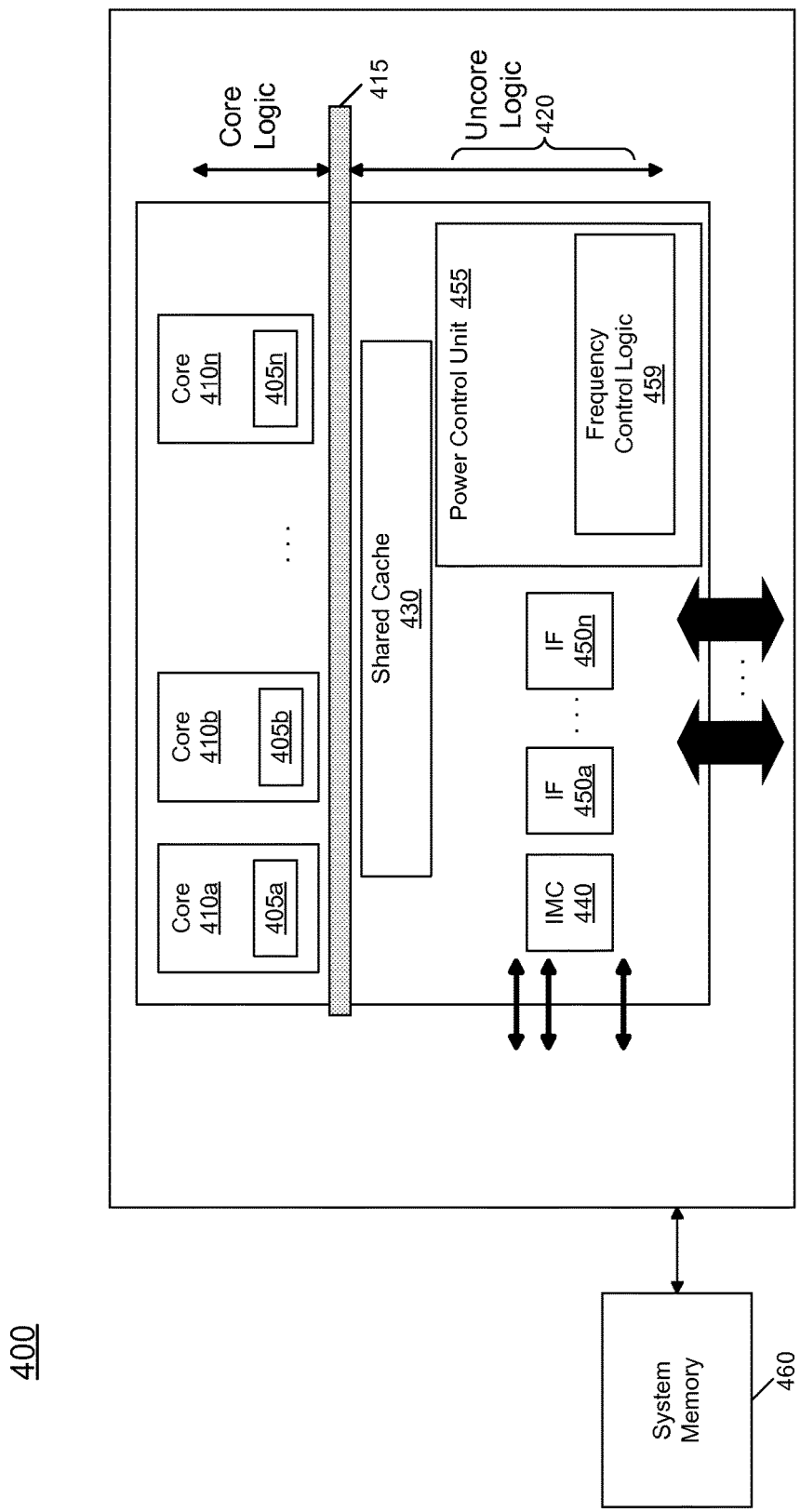
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. In the embodiment shown, each core 410 includes an energy counter 405, which may include appropriate counters and logic to generate a power consumption value for the given core. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a frequency control logic 459 in accordance with an embodiment of the present invention. Using this logic, the PCU may receive commands from an external controller such as a peripheral controller. Such commands may indicate a selected core (or cores) on which power management operations are to be performed, e.g., based on thread priority.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
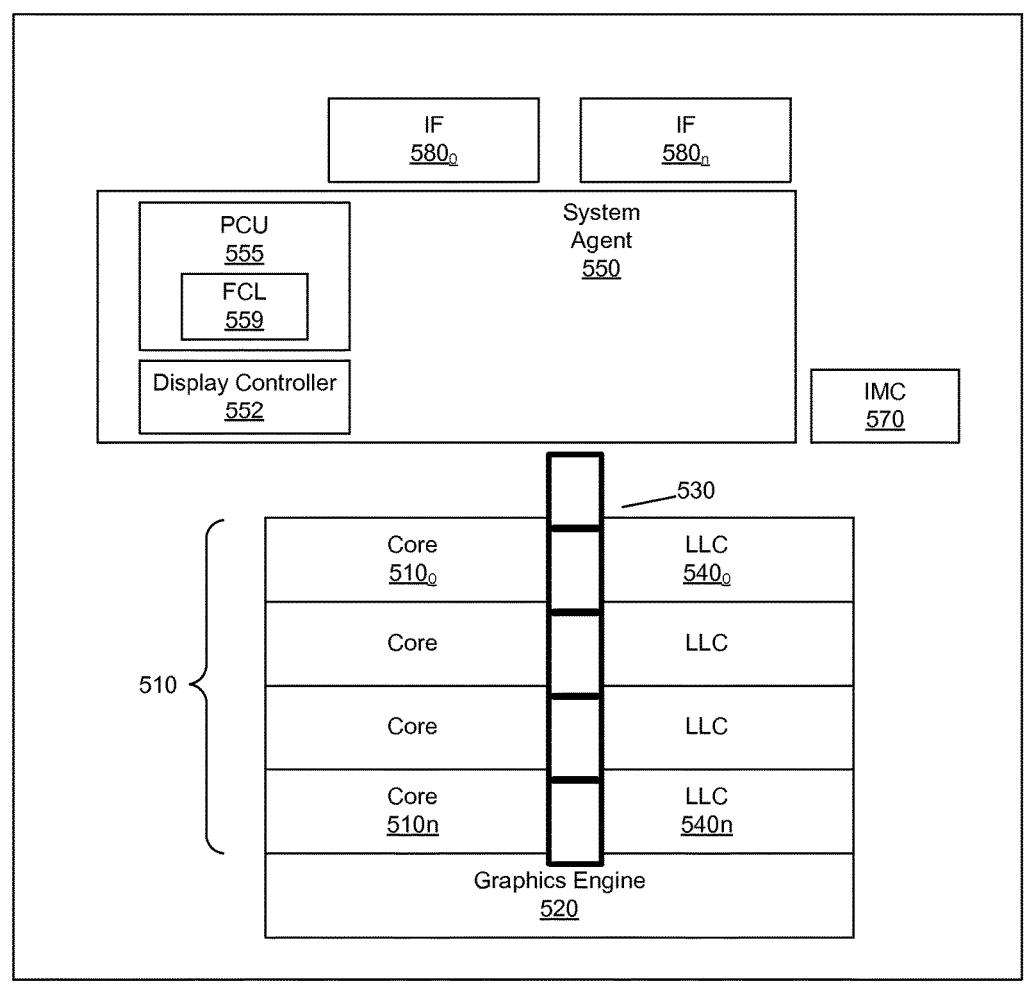
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a frequency control logic 559 in accordance with an embodiment of the present invention to control operating frequency of one or more cores based on a thread priority analysis performed, e.g., by a peripheral controller that executes the algorithm described above in FIG. 4.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard. For example, in other embodiments a SoC-type implementation may be present in which the peripheral controller can be incorporated in a processor package as part of processor 500.

Figure 7:
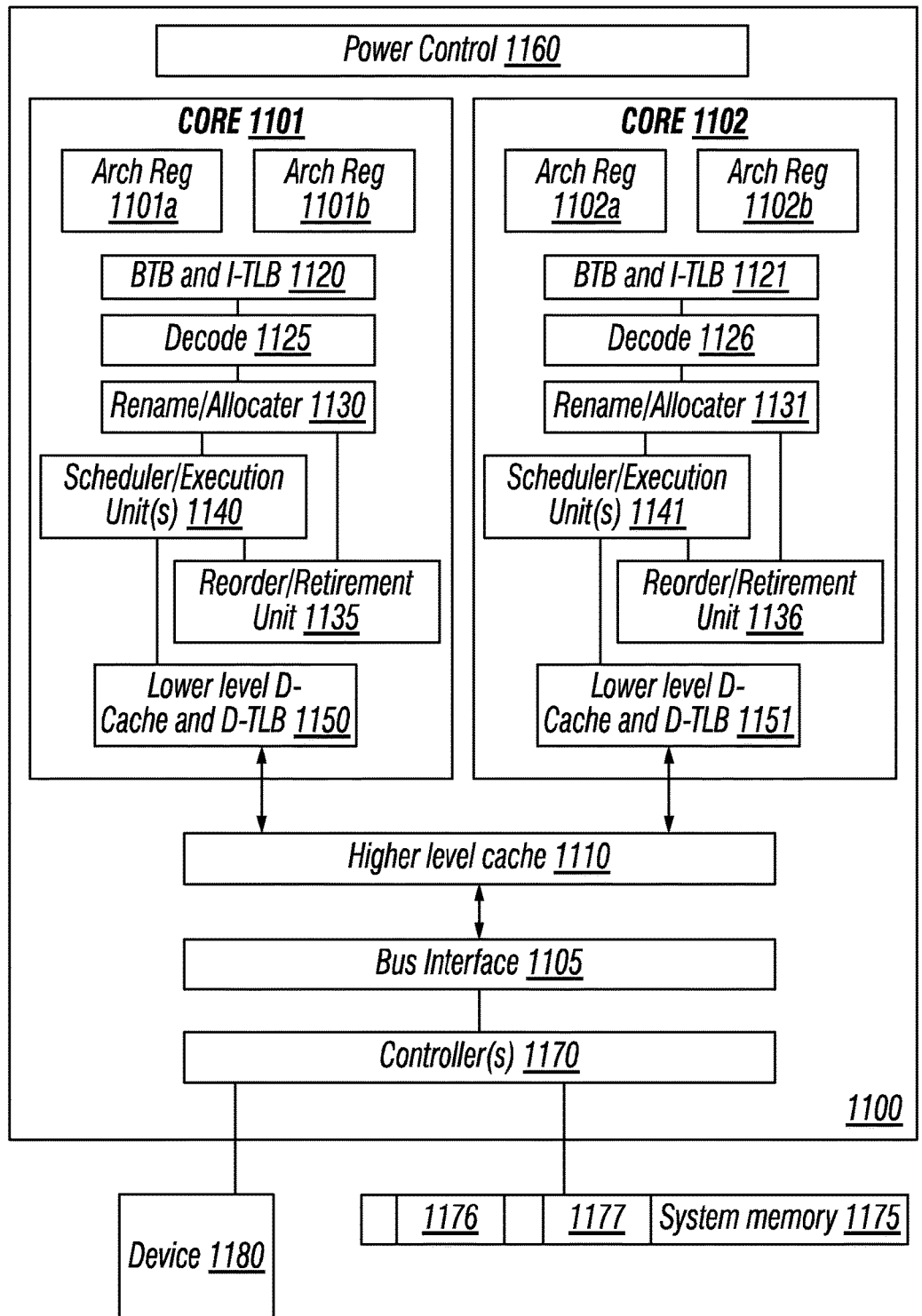
FIG. 7 is a block diagram of a processor including multiple cores in accordance with an embodiment of the present invention.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100.

Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
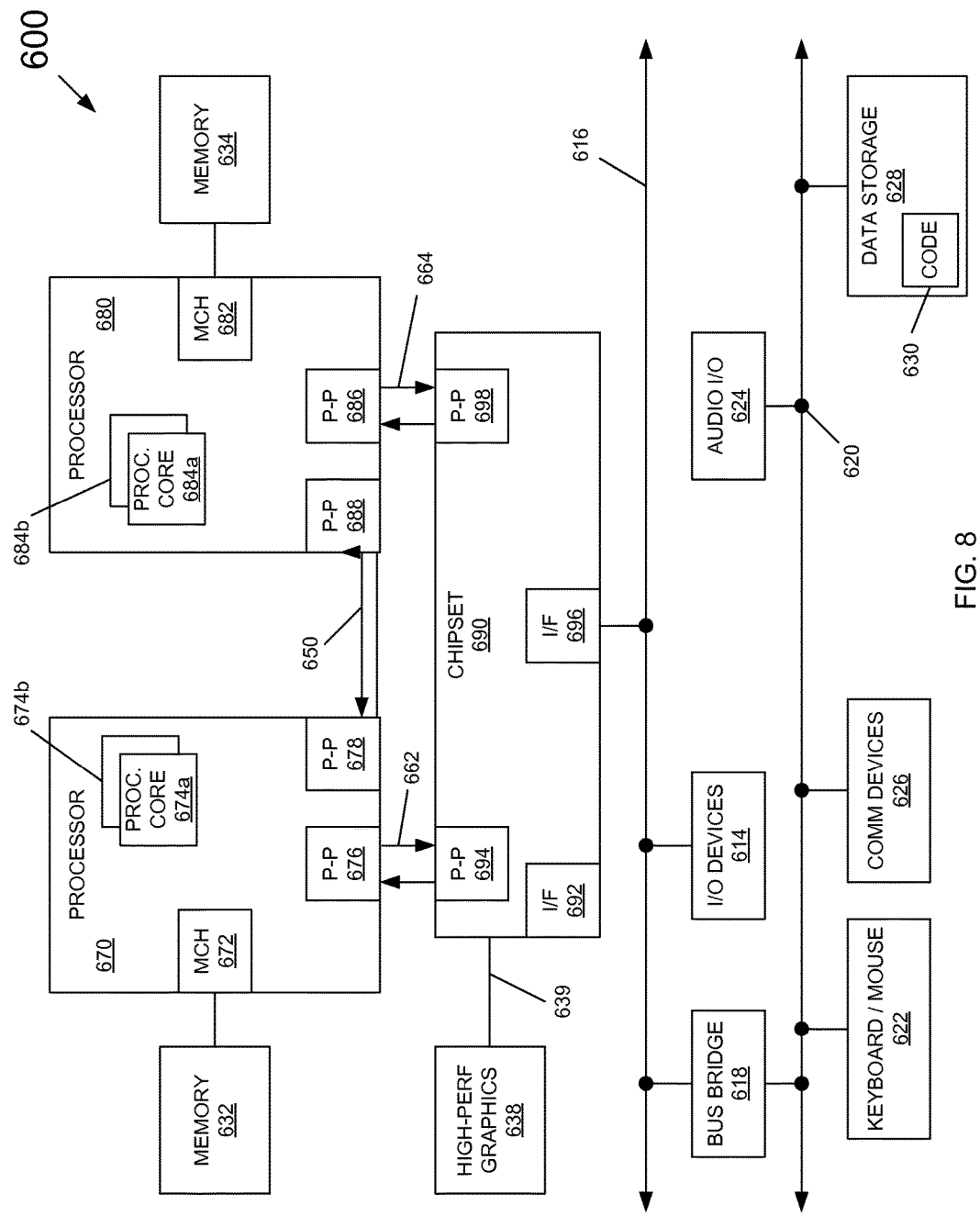
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698. In an embodiment, chipset 690 may include a management engine or other microcontroller to receive thread priority information and generate power management decisions that can be communicated to PCUs within processors 670 and 680 to enable thread-aware throttling of cores.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
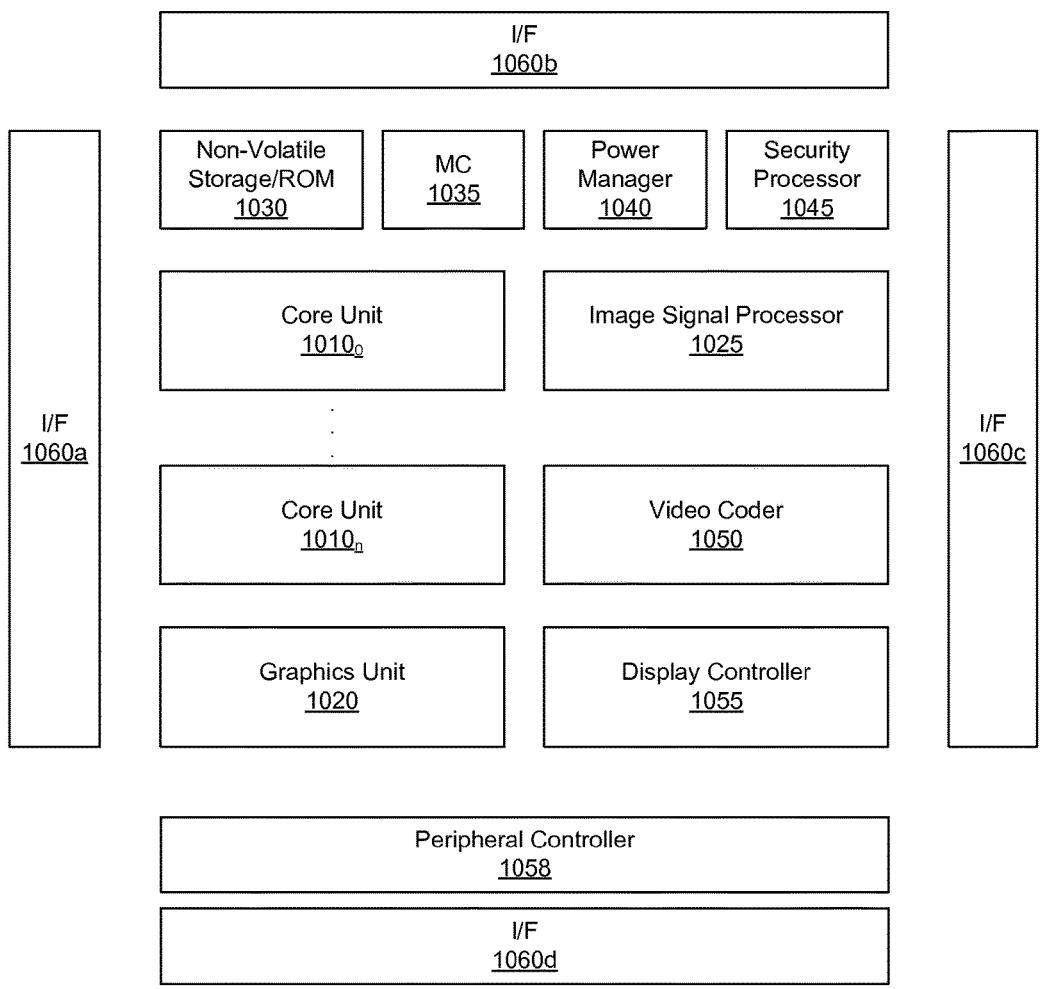
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth. In the embodiment shown, processor 1000 may further include a peripheral controller 1058 that has a management engine that can perform the thread-aware power management analysis described here.

Each of the units may have its power consumption controlled via a power manager 1040. Power manager 1040 includes control logic to perform power management operations based at least in part on commands from peripheral controller 1050, that itself may make power management decisions based on thread priority.

In some embodiments, SoC 1000 may further include a non-coherent fabric coupled to the coherent fabric to which various peripheral devices may couple. One or more interfaces 1060*a*-1060*d* enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

According to one example, a power management controller is to receive thread information from a scheduler, where the thread information includes thread priority information for a thread scheduled to a core of a multicore processor. The power management controller may further receive power consumption information from a PCU of the multicore processor, and determine a power management action to be taken by the PCU on at least one core of the multicore processor based at least in part on the thread priority information.

In one example, a thread policy table includes a plurality of entries each associated with a thread scheduled by the scheduler. Each entry of the thread policy table includes a thread identifier, an application identifier, the thread priority information, and an APIC identifier, in an embodiment.

In an example, the power management controller is to communicate with the multicore processor to determine a core identifier to indicate the core of the multicore processor that maps to the APIC identifier.

In an example, a peripheral controller includes the power management controller, and further includes a sideband interface to communicate with the multicore processor. Note that the power management controller may provide statistical information regarding execution of the thread to the scheduler via the sideband interface, where the scheduler is included within an operating system.

In an example, the power management controller is to associate a first plurality of threads with a first application, associate a second plurality of threads with a second application, and communicate to the scheduler statistical information regarding execution of the plurality of threads. The power management controller may further communicate to the scheduler a hint of a desired core on which to schedule a new thread, where the power management controller is to communicate the hint responsive to a request from the scheduler.

In an example, the power management controller is to receive policy information from a network management component and to determine the power management action based thereon. Also, the power management controller is to communicate an identification of a first subset of cores to the PCU to cause the PCU to throttle the first subset of cores, where a lower priority pool of threads is executed on the first subset of cores and a higher priority pool of threads is executed on a second subset of cores that are not to be throttled.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method includes: receiving thread information in a power management controller of a system for a first thread created by an OS; generating an entry in a thread policy table based on the thread information, where the entry includes an identifier for a core of a plurality of cores of the system on which the thread is to execute; monitoring one or more system parameters during execution of the thread; and performing a power management action based at least in part on the thread information, responsive to the monitoring.

In an example, the thread information includes a thread identifier, an application identifier, thread priority information, and an APIC identifier corresponding to the core identifier.

In an example, the method further includes comparing the one or more system parameters to one or more configuration values, and determining whether to perform the power management action further based on the comparison. As one example, the power management action includes throttling a second core and not throttling a first core, where the second core has a lower power consumption value than the first core, and the first core is executing a higher priority thread.

In an example, the method further includes receiving, in a peripheral controller including the power management controller, power control information regarding the monitoring from a processor via a sideband interface coupled between the processor and the peripheral controller.

In an example, the method further includes associating a first plurality of threads with a first application and associating a second plurality of threads with a second application.

In an example, the method further includes communicating statistical information regarding execution of the first plurality of threads and the second plurality of threads to the OS for use in scheduling.

In an example, the method further includes communicating an identification of a first subset of cores to a power controller in the processor to cause the power controller to throttle the first subset of cores, where the first plurality of threads are executed on the first subset of cores and the second plurality of threads are executed on a second subset of cores that are not to be throttled, the second application having a higher priority than the first application.

In another example, a computer readable medium includes instructions to perform the method of any of the above examples.

In another example, an apparatus comprises means for performing the method of any one of the above examples.

In another example, a communication device is arranged to perform the method of any of the above examples.

In yet another example, at least one machine readable medium comprises a plurality of instructions that in response to being executed on a computing device, cause the computing device to carry out a method according to any of the above examples.

In one example, a system includes a multicore processor having a plurality of cores and a PCU to control power consumption by the plurality of cores and a power management controller to receive thread information from a scheduler. This thread information may include thread priority information for a thread scheduled to a core of the multicore processor. Note that the power management controller may further receive power consumption information from the PCU and policy information from a system manager, and determine a power management action to be taken by the PCU on the core based at least in part on the thread priority information, the power consumption information, and the policy information.

In an example, a peripheral controller includes the power management controller, and the peripheral controller further includes a sideband interface to communicate with the multicore processor. In one example, a single semiconductor package includes the peripheral controller and the multicore processor.

In yet another example, a power management means is provided for receiving thread information from a scheduling means, the thread information including thread priority information for a thread scheduled to a core of a multicore processor. The power management means further is for receiving power consumption information from a PCU and policy information from a system manager, and for determining a power management action to be taken by the PCU on the core based at least in part on the thread priority information, the power consumption information, and the policy information.

In an example, a peripheral control means includes the power management means, and further includes a sideband interface to communicate with the multicore processor.

Understand that various combinations of the above examples are possible.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first integrated circuit comprising a power management controller having a microcontroller to receive thread information from a scheduler to execute on a second integrated circuit comprising a multicore processor coupled to the power management controller, the first integrated circuit comprising the power management controller external to the second integrated circuit comprising the multicore processor and independent of an operating system including the scheduler, the thread information including thread priority information for a thread scheduled by the scheduler to a core of the multicore processor, the power management controller further to receive power consumption information from a power control unit (PCU) of the multicore processor, wherein the power management controller is to determine a power management action to be taken by the PCU on at least one core of the multicore processor based at least in part on the thread priority information and communicate information regarding the power management action to the PCU to cause the PCU to perform the power management action, the power management controller to enforce power management policy for a system including the multicore processor and one or more other components, the power management controller to power manage the one or more other components and communicate with the multicore processor via a sideband interface.

2. The apparatus of claim 1, further comprising a thread policy table including a plurality of entries, each entry associated with a thread scheduled by the scheduler.

3. The apparatus of claim 2, wherein each entry of the thread policy table includes a thread identifier, an application identifier, the thread priority information, and an advanced programmable interrupt controller (APIC) identifier.

4. The apparatus of claim 3, wherein the power management controller is to communicate with the multicore processor to determine a core identifier to indicate the core of the multicore processor that maps to the APIC identifier.

5. The apparatus of claim 1, further comprising a peripheral controller including the power management controller, the peripheral controller further including the sideband interface to communicate with the multicore processor.

6. The apparatus of claim 5, wherein the power management controller is to provide statistical information regarding execution of the thread to the scheduler via the sideband interface, the scheduler included within the operating system.

7. The apparatus of claim 1, wherein the power management controller is to associate a first plurality of threads with a first application, associate a second plurality of threads with a second application, and communicate to the scheduler statistical information regarding execution of the plurality of threads.

8. The apparatus of claim 7, wherein the power management controller is to further communicate to the scheduler a hint of a desired core on which to schedule a new thread.

9. The apparatus of claim 7, wherein the power management controller is to communicate the hint responsive to a request from the scheduler.

10. The apparatus of claim 1, wherein the power management controller is to receive policy information from a network management component and to determine the power management action based thereon.

11. The apparatus of claim 1, wherein the power management controller is to communicate an identification of a first subset of cores to the PCU to cause the PCU to throttle the first subset of cores, wherein a lower priority pool of threads is executed on the first subset of cores and a higher priority pool of threads is executed on a second subset of cores that are not to be throttled, wherein the second subset of cores consumes greater power than the first subset of cores.

12. A method comprising:
receiving thread information in a power management controller of a system for a first thread created by an operating system (OS) executing on a multicore processor including a plurality of cores, the multicore processor coupled to the power management controller via a sideband interface, the power management controller independent of the OS and external to the multicore processor;

generating an entry in a thread policy table based on the thread information, the entry including an identifier for a core of the plurality of cores of the multicore processor on which the thread is to execute;

monitoring one or more system parameters of one or more devices of the system during execution of the thread; and performing a power management action on one or more cores of the plurality of cores of the multicore processor based at least in part on the one or more system parameters and the thread information, responsive to the monitoring.

13. The method of claim 12, wherein the thread information includes a thread identifier, an application identifier, thread priority information, and an advanced programmable interrupt controller (APIC) identifier corresponding to the core identifier.

14. The method of claim 12, further comprising comparing the one or more system parameters to one or more configuration values, and determining whether to perform the power management action further based on the comparison.

15. The method of claim 14, wherein the power management action comprises throttling a second core and not throttling a first core, the second core having a lower power consumption value than the first core, wherein the first core is executing a higher priority thread.

16. The method of claim 12, further comprising receiving, in a peripheral controller including the power management controller, power control information regarding the monitoring from the multicore processor via the sideband interface coupled between the multicore processor and the peripheral controller.

17. The method of claim 12, further comprising associating a first plurality of threads with a first application and associating a second plurality of threads with a second application.

18. The method of claim 17, further comprising communicating statistical information regarding execution of the first plurality of threads and the second plurality of threads to the OS for use in scheduling.

19. The method of claim 17, further comprising communicating an identification of a first subset of cores to a power controller in the processor to cause the power controller to throttle the first subset of cores, wherein the first plurality of threads are executed on the first subset of cores and the second plurality of threads are executed on a second subset of cores that are not to be throttled, the second application having a higher priority than the first application, wherein the second subset of cores are to operate at an operating point greater than a guaranteed operating point.

20. A system comprising:

a first integrated circuit comprising a multicore processor including a plurality of cores to execute a first pool of threads associated with a first virtual machine and a second pool of threads associated with a second virtual machine and a power control unit (PCU) to control power consumption by the plurality of cores; and a second integrated circuit coupled to the multicore processor, the second integrated circuit comprising a power management controller to receive thread information from a scheduler of an operating system (OS) to execute on the multicore processor, the thread information including thread priority information and a thread identifier for a thread of the second pool of threads scheduled to a core of the multicore processor by the scheduler and an application identifier of the first virtual machine, the power management controller further to receive power consumption information from the PCU via a sideband interface and policy information from a system manager, wherein the power management controller is to determine a power management action to be taken by the PCU on the core based at least in part on the thread priority information, the power consumption information, and the policy information and send information regarding the power management action to the PCU to cause the PCU to take the power management action, wherein the power management action includes to throttle one or more cores on which the first pool of threads executes while one or more other cores on which the second pool of threads executes are not throttled, wherein the second pool of threads has a higher thread priority than the first pool of threads.

21. The system of claim 20, further comprising a peripheral controller including the power management controller, the peripheral controller further including the sideband interface to communicate with the multicore processor.

22. The system of claim 21, wherein the power management controller is to cause the PCU to enable the one or more other cores to operate at a maximum power level while the one or more cores are throttled.

* * * * *